(12) United States Patent
Tsai et al.

(10) Patent No.: US 9,442,617 B2
(45) Date of Patent: Sep. 13, 2016

(54) MULTI-CHANNEL SENSING SYSTEM AND OPERATING METHOD THEREOF

(71) Applicant: Raydium Semiconductor Corporation, Hsinchu (TW)

(72) Inventors: Cheng-Rung Tsai, Hsinchu (TW); An-Yeu Wu, Hsinchu (TW); Shih-Lun Huang, Hsinchu (TW); Chih Yuan, New Taipei (TW); Hsu-Ming Chuang, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 71 days.

(21) Appl. No.: 14/598,931

(22) Filed: Jan. 16, 2015

(65) Prior Publication Data

US 2015/0205408 A1 Jul. 23, 2015

(30) Foreign Application Priority Data

Jan. 17, 2014 (TW) .............................. 103101826 A

(51) Int. Cl.
*G06F 3/044* (2006.01)
*G06F 3/041* (2006.01)
*G06F 3/042* (2006.01)

(52) U.S. Cl.
CPC ............. *G06F 3/044* (2013.01); *G06F 3/0416* (2013.01); *G06F 2203/04104* (2013.01)

(58) Field of Classification Search
CPC ...... G06F 3/044; G06F 3/0416; G06F 3/0428
See application file for complete search history.

(56) References Cited

U.S. PATENT DOCUMENTS

| | | | |
|---|---|---|---|
| 8,982,091 B1* | 3/2015 | Mohindra | G06F 3/044 345/173 |
| 2014/0267143 A1* | 9/2014 | Worfolk | G06F 3/0416 345/174 |
| 2015/0091872 A1* | 4/2015 | Worfolk | G06F 3/0428 345/175 |

\* cited by examiner

*Primary Examiner* — Lin Li

(57) ABSTRACT

A multi-channel sensing system and operating method thereof are disclosed. The multi-channel sensing system includes a transceiver, emitting electrodes, and a receiving electrode. The transceiver includes a spreading code generator and a modulator. The spreading code generator generates a non-orthogonal spreading code through an invertible matrix and then the modulator modulates a data signal to spreading signals according to the non-orthogonal spreading code. The emitting electrodes, corresponding to sensing channels respectively, emit the spreading signals at the same time to pass through corresponding sensing channels respectively, and the spreading signals are converted into coupled signals by capacitive coupling. The receiving electrode receives the coupled signals and generates a received signal according to the coupled signals.

18 Claims, 3 Drawing Sheets

MULTI-CHANNEL SENSING SYSTEM AND OPERATING METHOD THEREOF

BACKGROUND OF THE INVENTION

1. Field of the Invention

This invention relates to multi-channel sensing, especially to a multi-channel sensing system and an operating method thereof applied in a touch display panel.

2. Description of the Related Art

With the development of display technology, display panels with touch function have been widely used in all kinds of electronic products such as television, plat display, mobile phone, tablet PC, or projector and they are popular in the market.

In general, a conventional liquid crystal display with mutual capacitive touch function includes a display panel, an ITO sensor, and a touch control chip. The ITO sensor includes a plurality of sensing lines and a plurality of driving lines. The touch control chip includes a plurality of pins. The sensing lines are coupled to the pins respectively. After the driving line transmits a driving pulse and a small voltage is coupled at the sensing lines, the touch control chip will sense the coupled voltage and determine whether the ITO sensor is touched according to the value of the coupled voltage.

However, with the increasing size of the display panel, the conventional liquid crystal display has some drawbacks such as long touch reaction time, low scan rate, and the noise generated by the display panel will seriously affect the operation of the touch control chip and even cause error in touch point judgment. In some systems, an insulating material is disposed between the ITO sensor and the display panel to block the noise generated by the display panel; however, this structure will increase cost and the thickness of entire apparatus will be increased and this is not conducive to mechanical design. In addition, since the conventional touch sensing apparatus also needs amplifier to amplify the coupled voltage, it is hard to decrease the die size and the cost cannot be further decreased.

Therefore, the invention provides a multi-channel sensing system and an operating method thereof applied in a touch display panel to solve the above-mentioned problems.

SUMMARY OF THE INVENTION

An embodiment of the invention is a multi-channel sensing system. In this embodiment, the multi-channel sensing system can be applied to a touch display panel. The multi-channel sensing system includes a transceiver, emitting electrodes, and a receiving electrode. The transceiver includes a spreading code generator and a modulator. The spreading code generator generates a non-orthogonal spreading code through an invertible matrix and then the modulator modulates a data signal to spreading signals according to the non-orthogonal spreading code. The emitting electrodes, corresponding to sensing channels respectively, emit the spreading signals at the same time to pass through corresponding sensing channels respectively, and the spreading signals are converted into coupled signals by capacitive coupling. The receiving electrode receives the coupled signals and generates a received signal according to the coupled signals.

In an embodiment, the multi-channel sensing system further includes a receiver. The receiver is coupled to the receiving electrode. The receiver includes a demodulator. The demodulator demodulates the received signal through an inverse matrix of the invertible matrix to obtain cross-coupling coefficients of the plurality of coupled signals in the received signal.

In an embodiment, the multi-channel sensing system further includes a controller. The controller is coupled to the receiver, for determining whether the cross-coupling coefficients of the plurality of coupled signals equal to a default value respectively.

In an embodiment, when the controller determines that a cross-coupling coefficient of a first coupled signal of the plurality of coupled signals does not equal to the default value, the controller determines that a first sensing channel corresponding to the first coupled signal is affected by a touch event.

In an embodiment, the first sensing channel corresponds to a first position on a touch panel, and the touch event is that the first position on the touch panel is touched by an object.

In an embodiment, when the controller determines that a cross-coupling coefficient of a second coupled signal of the plurality of coupled signals equals to the default value, the controller determines that a second sensing channel corresponding to the second coupled signal is not affected by any touch event.

In an embodiment, a size of the invertible matrix depends on an amount of the plurality of emitting electrodes.

In an embodiment, the amount of the plurality of emitting electrodes is a positive integer larger than 1.

In an embodiment, the invertible matrix is an invertible harmony matrix.

In an embodiment, each row of the invertible matrix has the same total.

Another embodiment of the invention is a multi-channel sensing system operating method. In this embodiment, the multi-channel sensing system operating method is used for operating a multi-channel sensing system having a plurality of sensing channels. The multi-channel sensing system includes a transceiver, a plurality of emitting electrodes, and a receiving electrode. The plurality of emitting electrodes corresponds to the plurality of sensing channels respectively.

The multi-channel sensing system operating method includes steps of: (a) when the transceiver receives a data signal, the transceiver generating a non-orthogonal spreading code through an invertible matrix and modulating the data signal to a plurality of spreading signals according to the non-orthogonal spreading code; (b) the plurality of emitting electrodes emitting the plurality of spreading signals at the same time to pass through corresponding sensing channels respectively, wherein the plurality of spreading signals are converted into a plurality of coupled signals by capacitive coupling; and (c) the receiving electrode receiving the plurality of coupled signals and generating a received signal according to the plurality of coupled signals.

Compared to the prior art, the multi-channel sensing system and the multi-channel sensing system operating method of the invention can be applied to the touch display panel and have the following advantages.

(1) With the application of the frequency spreading technology, a plurality of emitting electrodes can be driven at the same time and the coupled signals from different sensing channels can be effectively determined; therefore, the touch reaction time of the multi-channel sensing system of the invention can be largely reduced.

(2) Since the spreading signal has good capability to resist noises and interferences, no mechanism or element is necessary for the multi-channel sensing system of the invention to increase the signal-to-noise ratio (SNR); therefore, the cost can be reduced and signals with lower power can be used to drive the sensing circuit to lower power consumption.

(3) With the application of the invertible matrix having variable length and its inverse matrix, the multi-channel sensing system of the invention generates an invertible matrix and its inverse matrix and their sizes correspond to the amount of the sensing channels of the touch display panel. In addition, the invertible matrix and its inverse matrix are applied in the spreading code generator of the transceiver and the demodulator respectively; therefore, not only the use of resources can be maximized, but also the non-orthogonal spreading code generated has more flexibility and convenience than the conventional orthogonal coding technology.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
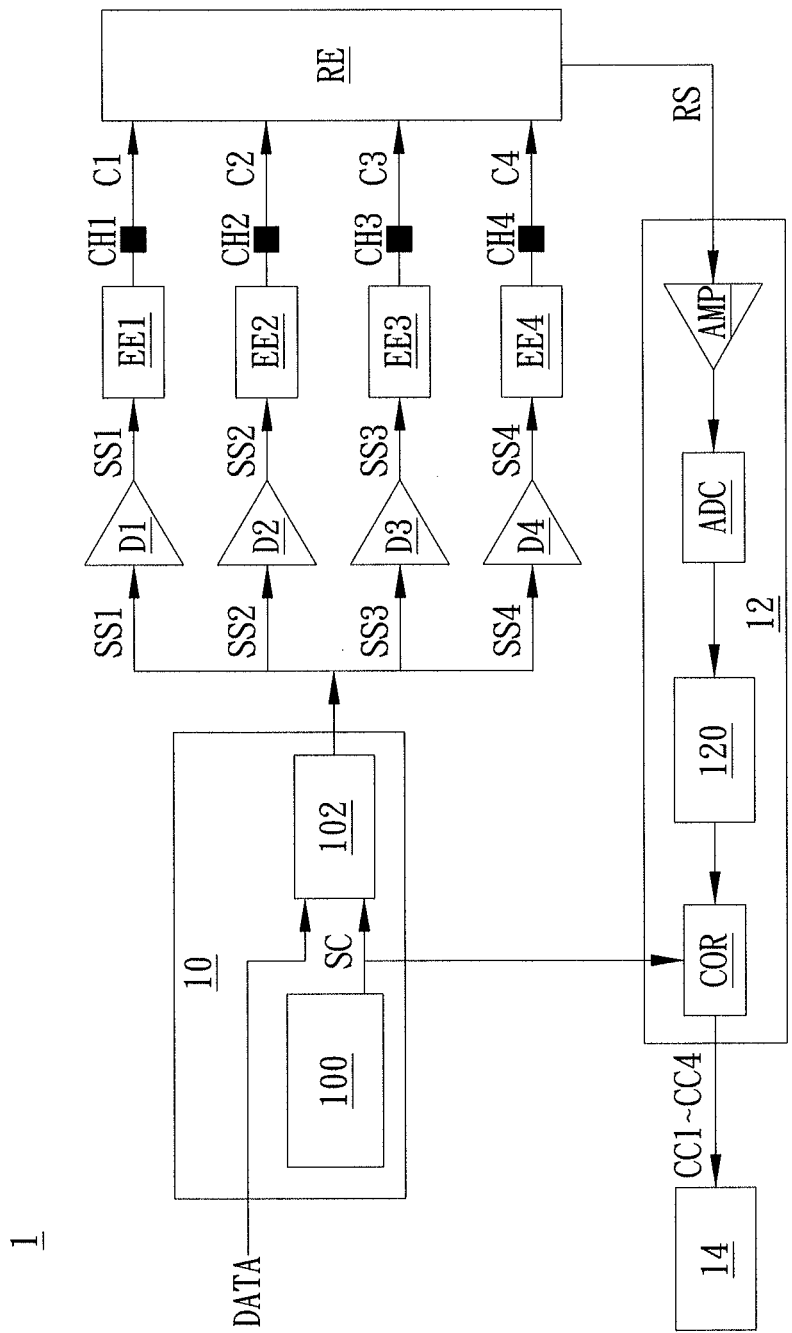
FIG. 1 illustrates a schematic diagram of the multi-channel sensing system in a preferred embodiment of the invention.

A preferred embodiment of the invention is a multi-channel sensing system. In this embodiment, the multi-channel sensing system having a plurality of sensing channels can be applied to a touch display panel, but not limited to this. Please refer to FIG. 1. FIG. 1 illustrates a schematic diagram of the multi-channel sensing system of this embodiment. It should be noticed that the elements and their amount illustrated in FIG. 1 are only an example of the invention.

As shown in FIG. 1, the multi-channel sensing system 1 of this embodiment has four sensing channels CH1, CH2, CH3, and CH4 corresponding to a first position, a second position, a third position, and a fourth position on a touch panel respectively. The multi-channel sensing system 1 includes a transceiver 10, four drivers D1~D4, four emitting electrodes EE1~EE4, a receiving electrode RE, a receiver 12, and a controller 14.

Wherein, the transceiver 10 is coupled to the drivers D1~D4 and receiver 12 respectively; the drivers D1~D4 are coupled to the emitting electrodes EE1~EE4 respectively; the sensing channels CH1~CH4 are disposed between the emitting electrodes EE1~EE4 and the receiving electrode RE respectively; the receiving electrode RE is coupled to the receiver 12; the receiver 12 is coupled to the controller 14.

In this embodiment, the transceiver 10 includes a spreading code generator 100 and a modulator 102. The receiver 12 includes an amplifier AMP, an analog-to-digital converter ADC, a demodulator 120, and a correlation unit COR. Wherein, the spreading code generator 100 is coupled to the modulator 102 and the correlation unit COR respectively; the modulator 102 is coupled to the drivers D1~D4; the amplifier AMP is coupled between the receiving electrode RE and the analog-to-digital converter ADC; the analog-to-digital converter ADC is coupled to the demodulator 120; the demodulator 120 is coupled to the correlation unit COR; the correlation unit COR is coupled to the controller 14.

In this embodiment, when the receiver 10 receives a data signal DATA, the spreading code generator 100 generates a non-orthogonal spreading code SC through an invertible matrix, and the modulator 102 modulates the data signal DATA to a plurality of spreading signals SS1~SS4 according to the non-orthogonal spreading code SC.

In fact, the size of the invertible matrix depends on the amount of the emitting electrodes (or sensing channels). The spreading code generator 100 can use any kinds of invertible matrix including invertible harmony matrix to generate the non-orthogonal spreading code SC only if the size of the invertible matrix corresponds to the amount of the emitting electrodes (or sensing channels). For example, the following invertible matrixes having different sizes can be used to generate the non-orthogonal spreading code SC:

$$\begin{pmatrix} 1 & 0 \\ 0 & 1 \end{pmatrix}, \begin{pmatrix} 1 & -1 \\ -1 & 1 \end{pmatrix}, \begin{pmatrix} 1 & 0 & 0 \\ 0 & 1 & 0 \\ 0 & 0 & 1 \end{pmatrix} \begin{pmatrix} 1 & -1 & -1 \\ -1 & 1 & -1 \\ -1 & -1 & 1 \end{pmatrix},$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}, \begin{pmatrix} 1 & -1 & -1 & -1 \\ -1 & 1 & -1 & -1 \\ -1 & -1 & 1 & -1 \\ -1 & -1 & -1 & 1 \end{pmatrix}$$

If each row of the invertible matrix used to generate the non-orthogonal spreading code SC by the spreading code generator 100 has the same total, the invertible matrix is called "an invertible harmony matrix". The advantage of the spreading code generator 100 using the invertible harmony matrix to generate the non-orthogonal spreading code SC is that since each row in the invertible harmony matrix has the same total, the complexity and cost of the receiver 12 can be largely reduced.

Then, the modulator 102 transmits the plurality of spreading signals SS1~SS4 to the drivers D1~D4 respectively, and the drivers D1~D4 drive the plurality of emitting electrodes EE1~EE4 to emit the plurality of spreading signals SS1~SS4 at the same time to pass through corresponding sensing channels CH1~CH4 respectively. The plurality of spreading signals SS1~SS4 are converted into a plurality of coupled signals C1~C4 by capacitive coupling. Then, the receiving electrode RE will receive the plurality of coupled signals C1~C4 and generate a received signal RD according to the plurality of coupled signals C1~C4.

Figure 2:
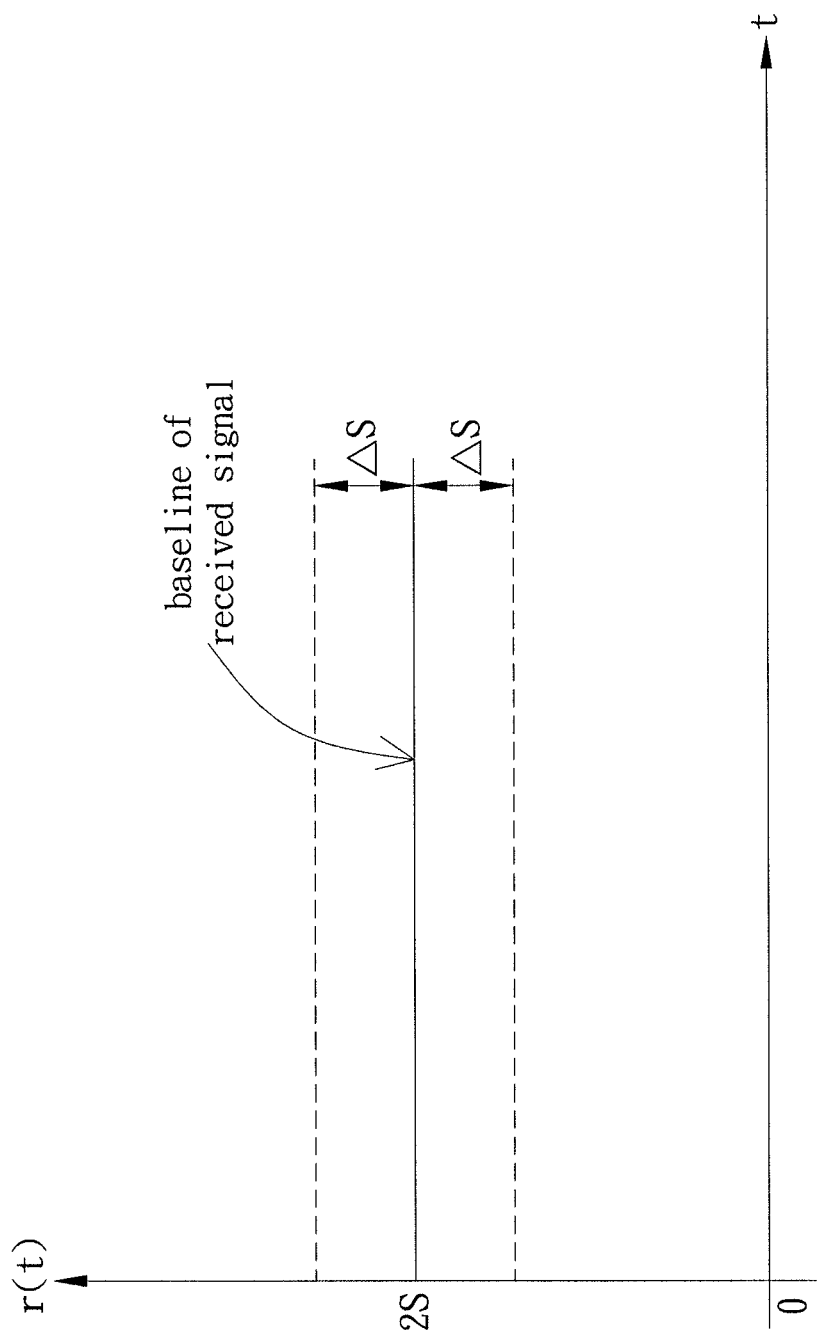
FIG. 2 illustrates a schematic diagram of the sensing range of the received signal.

Please refer to FIG. 2. FIG. 2 illustrates a schematic diagram of the sensing range of the received signal. As shown in FIG. 2, when the spreading code generator 100 uses the invertible harmony matrix to generate the non-orthogonal spreading code SC, since each row of the invertible harmony matrix has the same total, the baseline of the received signal can be maintained at a fixed value 2s, so that the sensing range of the received signal can be only $2\Delta S$ ($=\Delta S+\Delta S$) to reduce touch sensing time.

Then, the receiver 12 receives the received signal RS from the receiving electrode RE and after the received signal RS is amplified by the amplifier AMP and converted from analog type to digital type by the analog-to-digital converter ADC, it will be transmitted to the demodulator 120. Afterward, the demodulator 120 will demodulate the received signal RS having digital type through an inverse matrix of the above-mentioned invertible matrix, and use the correlation unit COR to perform correlation process according to the demodulated received signal RS and the non-orthogonal spreading code SC to obtain cross-coupling coefficients CC1~CC4 of the coupled signals C1~C4 of the received signal RS. When the controller 14 receives the cross-coupling coefficients CC1~CC4 of the coupled signals C1~C4 from the correlation unit COR, the controller 14 will determine whether a touch event occurs according to whether the cross-coupling coefficients CC1~CC4 of the coupled signals C1~C4 are equal to a default value.

In practical applications, because the sensing channels CH1~CH4 of the multi-channel sensing system 1 may be affected by the touch event, the capacitive coupling degree when the spreading signals SS1~SS4 are capacitive coupled to the coupled signals C1~C4 will be changed; therefore, the capacitive coupling degree can be quantified to the cross-coupling coefficients CC1~CC4 of the coupled signals C1~C4. If no touch event occurs, the cross-coupling coefficients CC1~CC4 of the coupled signals C1~C4 will be equal to the default value (e.g., the default value is usually 1); if one of the sensing channels CH1~CH4 is affected by the touch event, the cross-coupling coefficient corresponding to the sensing channel will be not equal to the default value (e.g., the cross-coupling coefficient is usually smaller than the default value).

Taking the cross-coupling coefficient CC1 of the coupled signal C1 for example, if the controller 14 determines that the cross-coupling coefficient CC1 of the coupled signal C1 is not equal to the default value, the controller 14 will determine that the first sensing channel CH1 corresponding to the coupled signal C1 is affected by the touch event. Since the first sensing channel CH1 corresponds to a first position on the touch panel, the touch event is that the first position on the touch panel is touched by an object. If the controller 14 determines that the cross-coupling coefficient CC1 of the coupled signal C1 is equal to the default value, the controller 14 will determine that the first sensing channel CH1 corresponding to the coupled signal C1 is not affected by any touch event; that is to say, the first position on the touch panel is not touched by any object.

It should be noticed that the amount of the drivers and the emitting electrodes of the multi-channel sensing system 1 corresponds to the amount of the sensing channels of the multi-channel sensing system 1, and the size of the invertible matrix that the spreading code generator 100 uses to generate the non-orthogonal spreading code SC also corresponds to the amount of the sensing channels. Therefore, no matter what amount of the sensing channels, drivers, and emitting electrodes of the multi-channel sensing system 1 is, the spreading code generator 100 can generate the non-orthogonal spreading code SC through the invertible matrix having corresponding size. In this invention, the amount of the sensing channels and the emitting electrodes of the multi-channel sensing system 1 can be any positive integer larger than 2. It has more flexibility and convenience than the conventional orthogonal coding technology which has the limitation that the amount of the emitting electrodes of the multi-channel sensing system should be $2^N$ and N is a positive integer.

Another embodiment of the invention is a multi-channel sensing system operating method. In this embodiment, the multi-channel sensing system operating method is used for operating a multi-channel sensing system having a plurality of sensing channels. The multi-channel sensing system includes a transceiver, a plurality of emitting electrodes, and a receiving electrode. The plurality of emitting electrodes corresponds to the plurality of sensing channels respectively.

Figure 3:
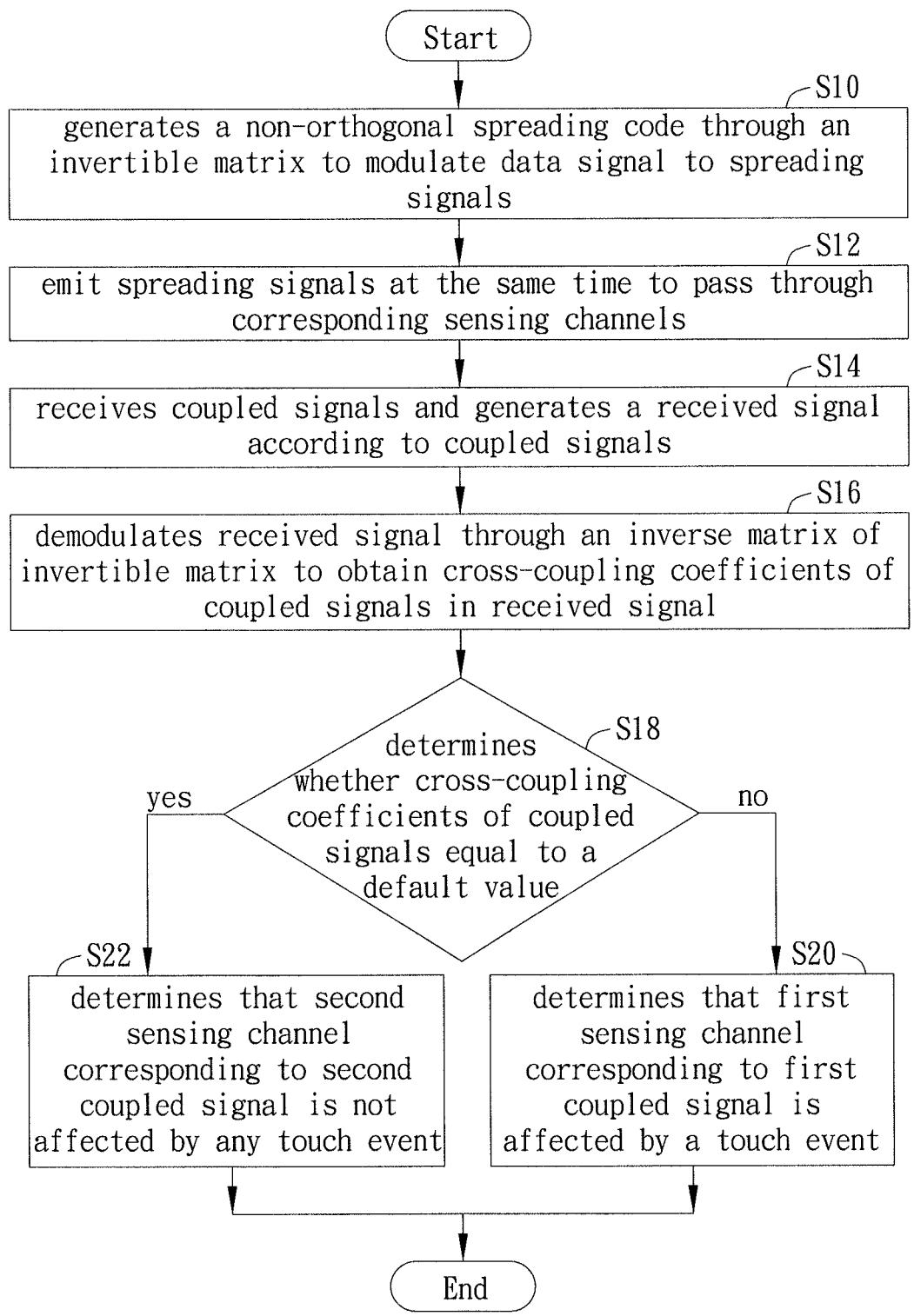
FIG. 3 illustrates a flow chart of the multi-channel sensing system operating method in another preferred embodiment of the invention.

Please refer to FIG. 3. FIG. 3 illustrates a flow chart of the multi-channel sensing system operating method in this embodiment. As shown in FIG. 3, at first, in the step S10, when the transceiver receives a data signal, the transceiver will generate a non-orthogonal spreading code through an invertible matrix and modulate the data signal to a plurality of spreading signals according to the non-orthogonal spreading code.

In the step S12, the plurality of emitting electrodes emits the plurality of spreading signals at the same time to pass through corresponding sensing channels respectively, wherein the plurality of spreading signals are converted into a plurality of coupled signals by capacitive coupling.

In the step S14, the receiving electrode receives the plurality of coupled signals and generates a received signal according to the plurality of coupled signals.

In an embodiment, the multi-channel sensing system also includes a receiver. In the step S16, the receiver demodulates the received signal through an inverse matrix of the invertible matrix to obtain cross-coupling coefficients of the plurality of coupled signals in the received signal.

In an embodiment, the multi-channel sensing system also includes a controller. In the step S18, the controller determines whether the cross-coupling coefficients of the plurality of coupled signals equal to a default value respectively.

If the determination result of the step S18 is NO, that is to say, the cross-coupling coefficient of a first coupled signal of the coupled signals is not equal to the default value, the method will perform the step S20. In the step S20, the controller determines that the first sensing channel corresponding to the first coupled signal is affected by a touch event. Wherein, the first sensing channel corresponds to a first position on a touch panel and the touch event is that the first position on the touch panel is touched by an object.

If the determination result of the step S18 is YES, that is to say, that is to say, the cross-coupling coefficient of a second coupled signal of the coupled signals is equal to the default value, the method will perform the step S22. In the step S22, the controller determines that the second sensing channel corresponding to the second coupled signal is not affected by any touch event.

Compared to the prior art, the multi-channel sensing system and the multi-channel sensing system operating method of the invention can be applied to the touch display panel and have the following advantages.

(1) With the application of the frequency spreading technology, a plurality of emitting electrodes can be driven at the same time and the coupled signals from different sensing channels can be effectively determined; therefore, the touch reaction time of the multi-channel sensing system of the invention can be largely reduced.

(2) Since the spreading signal has good capability to resist noises and interferences, no mechanism or element is necessary for the multi-channel sensing system of the invention to increase the signal-to-noise ratio (SNR); therefore, the cost can be reduced and signals with lower power can be used to drive the sensing circuit to lower power consumption.

(3) With the application of the invertible matrix having variable length and its inverse matrix, the multi-channel sensing system of the invention generates an invertible matrix and its inverse matrix and their sizes correspond to the amount of the sensing channels of the touch display panel. In addition, the invertible matrix and its inverse matrix are applied in the spreading code generator of the transceiver and the demodulator respectively; therefore, not only the use of resources can be maximized, but also the non-orthogonal spreading code generated has more flexibility and convenience than the conventional orthogonal coding technology.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A multi-channel sensing system, having a plurality of sensing channels, the multi-channel sensing system comprising:
    a transceiver, comprising a spreading code generator and a modulator, the spreading code generator generating a non-orthogonal spreading code through an invertible matrix and the modulator modulating a data signal to a plurality of spreading signals according to the non-orthogonal spreading code;
    a plurality of emitting electrodes, corresponding to the plurality of sensing channels respectively, the plurality of emitting electrodes emitting the plurality of spreading signals at the same time to pass through corresponding sensing channels respectively, wherein the plurality of spreading signals are converted into a plurality of coupled signals by capacitive coupling; and
    a receiving electrode, for receiving the plurality of coupled signals and generating a received signal according to the plurality of coupled signals.

2. The multi-channel sensing system of claim 1, further comprising:
    a receiver, coupled to the receiving electrode, the receiver comprising a demodulator, the demodulator demodulating the received signal through an inverse matrix of the invertible matrix to obtain cross-coupling coefficients of the plurality of coupled signals in the received signal.

3. The multi-channel sensing system of claim 2, further comprising:
    a controller, coupled to the receiver, for determining whether the cross-coupling coefficients of the plurality of coupled signals equal to a default valve respectively.

4. The multi-channel sensing system of claim 3, wherein when the controller determines that a cross-coupling coefficient of a first coupled signal of the plurality of coupled signals does not equal to the default value, the controller determines that a first sensing channel corresponding to the first coupled signal is affected by a touch event.

5. The multi-channel sensing system of claim 4, wherein the first sensing channel corresponds to a first position on a touch panel, and the touch event is that the first position on the touch panel is touched by an object.

6. The multi-channel sensing system of claim 3, wherein when the controller determines that a cross-coupling coefficient of a second coupled signal of the plurality of coupled signals equals to the default value, the controller determines that a second sensing channel corresponding to the second coupled signal is not affected by any touch event.

7. The multi-channel sensing system of claim 1, wherein a size of the invertible matrix depends on an amount of the plurality of emitting electrodes.

8. The multi-channel sensing system of claim 1, wherein the amount of the plurality of emitting electrodes is a positive integer larger than 1.

9. The multi-channel sensing system of claim 1, wherein the invertible matrix is an invertible harmony matrix.

10. A multi-channel sensing system operating method, for operating a multi-channel sensing system having a plurality of sensing channels, the multi-channel sensing system comprising a transceiver, a plurality of emitting electrodes, and a receiving electrode, the plurality of emitting electrodes corresponding to the plurality of sensing channels respectively, the multi-channel sensing system operating method comprising steps of:
    (a) when the transceiver receives a data signal, the transceiver generating a non-orthogonal spreading code through an invertible matrix and modulating the data signal to a plurality of spreading signals according to the non-orthogonal spreading code;
    (b) the plurality of emitting electrodes emitting the plurality of spreading signals at the same time to pass through corresponding sensing channels respectively, wherein the plurality of spreading signals are converted into a plurality of coupled signals by capacitive coupling; and
    (c) the receiving electrode receiving the plurality of coupled signals and generating a received signal according to the plurality of coupled signals.

11. The multi-channel sensing system operating method of claim 10, wherein the multi-channel sensing system further comprises a receiver, the method further comprises a step of:
    (d) the receiver demodulating the received signal through an inverse matrix of the invertible matrix to obtain cross-coupling coefficients of the plurality of coupled signals in the received signal.

12. The multi-channel sensing system operating method of claim 11, wherein the multi-channel sensing system further comprises a controller, the method further comprises a step of:
    (e) the controller determining whether the cross-coupling coefficients of the plurality of coupled signals equal to a default valve respectively.

13. The multi-channel sensing system operating method of claim 12, wherein when a determining result of the step (e) is that a cross-coupling coefficient of a first coupled signal of the plurality of coupled signals does not equal to the default value, the controller determines that a first sensing channel corresponding to the first coupled signal is affected by a touch event.

14. The multi-channel sensing system operating method of claim 13, wherein the first sensing channel corresponds to a first position on a touch panel, and the touch event is that the first position on the touch panel is touched by an object.

15. The multi-channel sensing system operating method of claim 12, wherein when a determining result of the step (e) is that a cross-coupling coefficient of a second coupled signal of the plurality of coupled signals equals to the default value, the controller determines that a second sensing channel corresponding to the second coupled signal is not affected by any touch event.

16. The multi-channel sensing system operating method of claim 10, wherein a size of the invertible matrix depends on an amount of the plurality of emitting electrodes.

17. The multi-channel sensing system operating method of claim 10, wherein the amount of the plurality of emitting electrodes is a positive integer larger than 1.

18. The multi-channel sensing system operating method of claim 10, wherein the invertible matrix is an invertible harmony matrix.

* * * * *